(12) United States Patent
Sanchez et al.

(10) Patent No.: US 12,504,034 B2
(45) Date of Patent: Dec. 23, 2025

(54) FASTENING SYSTEM USING AN AXIALLY MAGNETIZED THREADED INSERT

(71) Applicant: TELADOC HEALTH, INC., Purchase, NY (US)

(72) Inventors: Daniel Steven Sanchez, Goleta, CA (US); Franco Medus, Bahia Blanca (AR)

(73) Assignee: TELADOC HEALTH, INC., New York, NY (US)

( * ) Notice: Subject to any disclaimer, the term of this patent is extended or adjusted under 35 U.S.C. 154(b) by 0 days.

(21) Appl. No.: 18/671,223

(22) Filed: May 22, 2024

(65) Prior Publication Data

US 2024/0309904 A1    Sep. 19, 2024

Related U.S. Application Data

(63) Continuation of application No. 18/064,063, filed on Dec. 9, 2022, now abandoned.

(60) Provisional application No. 63/265,242, filed on Dec. 10, 2021.

(51) Int. Cl.
   *F16B 33/02* (2006.01)
(52) U.S. Cl.
   CPC .................... *F16B 33/02* (2013.01)
(58) Field of Classification Search
   CPC ........................................ F16B 33/02
   See application file for complete search history.

(56) References Cited

U.S. PATENT DOCUMENTS

| | | | |
|---|---|---|---|
| 10,520,006 B1 * | 12/2019 | Sauseda | F16B 33/004 |
| 2021/0396265 A1 * | 12/2021 | Stempfley | F16B 13/128 |

FOREIGN PATENT DOCUMENTS

| | | | | |
|---|---|---|---|---|
| KR | 20080021745 A | * | 3/2008 | F16B 39/02 |

OTHER PUBLICATIONS

Machine translation of KR-20080021745-A (Year: 2008).*
Abbott Interfast, Carbon Steel Fasteners, screenshot taken on Jun. 19, 2019, available at https://www.aicfast.com/steel/ (Year: 2019).*
Benjamen Johnson, Magnetic Nut and Bolt Holders for Wrenches and Hex Keys, ToolGuyd, Published Jan. 7, 2015, available at https://toolguyd.com/magnetic-nut-bolt-holders-for-wrenches-hex-keys/ (Year: 2015).*

* cited by examiner

Primary Examiner — Kyle A Cook
(74) Attorney, Agent, or Firm — Chris Lambrecht

(57) ABSTRACT

Disclosed is an improved fastening system that leverages magnetism to assist in the installation of a fastener. The system may include an axially magnetized insert adapted to be secured within a bore in a surrounding material. The insert may be composed of a material having a magnetic permeability that is higher than that of the surrounding material. The insert may include a helical threaded interior surface adapted to receive a ferromagnetic screw. When placed in proximity of the insert, the tip of the screw is pulled into and held in alignment with the insert by the magnetic field emanating from the magnet. The fastening system may be particularly beneficial in environments where positioning or holding the screw in the starting position is difficult.

3 Claims, 5 Drawing Sheets

FASTENING SYSTEM USING AN AXIALLY MAGNETIZED THREADED INSERT

CROSS-REFERENCE TO RELATED APPLICATIONS

This application is a continuation of U.S. application Ser. No. 18/064,063, filed Dec. 9, 2022, which claims the benefit of U.S. provisional application No. 63/265,242, filed Dec. 10, 2021, the contents of which are hereby incorporated by reference in their entirety.

BACKGROUND

This disclosure relates generally to the field of fastening systems, and particularly to field of screws and other helical threaded fastening systems. Helical threaded fasteners are known in the art and provide a simple solution to the need to fasten two or more materials. By way of example, a first material may be provided with a helical threaded bore. A second material may also be provided with a hole or bore that is large enough to accommodate the threads of a screw but smaller than the head of the screw. The second material is positioned relative to the first material such that the hole in the second material is axially aligned with the bore in the first material. The tip end of the screw is then positioned such that it is axially aligned with the hole and bore and brought into contact with the threading of the bore, referred to herein as the starting position. The screw is then rotated to engage the threads of the screw with those of the bore. Continuing to rotate the screw causes the screw to move into the bore until the screw reaches a desired position with respect to the bore. Often, the screw is rotated until the second material is pinched between the head of the screw and the first material with a desired force.

Helical threaded fasters are ubiquitous in the assembly of all manner of goods, from hearing aids to automobiles to large-scale construction projects. Though simple in theory, the practical realities of assembly and production with helical threaded fasteners present situations in which the positioning of the screw into the starting position can be difficult. For example, space constraints may hinder the ability of an assembly technician to physically manipulate the screw into the starting position and rotate the screw into engagement with the bore. In addition, even if the assembler can manipulate the screw into the starting position, gravity may remove the screw from the starting position while the assembler is retrieving or positioning a driver to rotate the screw into engagement with the bore. The size or shape of a screw may also present difficulty even when space constraints or gravity do not. In any case, these difficulties can result in repeated, failed attempts to engage the screw with the bore, which can increase assembly time and decrease production efficiency.

SUMMARY

What is needed is a fastening system that overcomes the difficulties associated with positioning a screw into an appropriate starting position. This and other advantages are achieved by aspects of the following disclosure, which include a fastener, fastening system, and fastening method that employ magnetism to both position and hold a screw in an appropriate starting position.

One aspect of this disclosure is a fastening device. The fastening device comprises an insert composed of an axially magnetized material. The insert includes a helical threaded interior surface adapted to receive a ferromagnetic screw and an exterior surface adapted to be secured to a surrounding material. The surrounding material has a magnetic permeability that is less than that of the insert.

Another aspect of the disclosure is a fastening system. The system includes a magnet, a ferromagnetic insert, and a ferromagnetic screw. The insert is secured within a bore in a surrounding material. The magnet is positioned in proximity of a first end of the insert. The insert has a helical threaded interior surface. The screw engages the threaded interior surface of the insert at a second end of the insert.

Yet another aspect of the disclosure is a fastening method. The method includes securing a ferromagnetic insert within a bore in a surrounding material, wherein a first end of the insert is in proximity of a magnet and the insert has a helical threaded interior surface. The method further includes rotating a ferromagnetic screw into engagement with a second end of the insert.

DETAILED DESCRIPTION

Disclosed herein is a fastener, fastening system, and method for fastening that make use of magnetism to guide and hold a screw in a starting position. The screw's starting position, as used herein, is a position and orientation of the screw relative to a bore, or an insert secured within a bore, wherein rotating the screw in a first direction (e.g., clockwise) around its long axis will cause a thread on a surface of the screw to engage a thread on an interior surface of the bore or insert. Aspects of the disclosure will be discussed in detail with reference to the figures, below.

Figure 1:
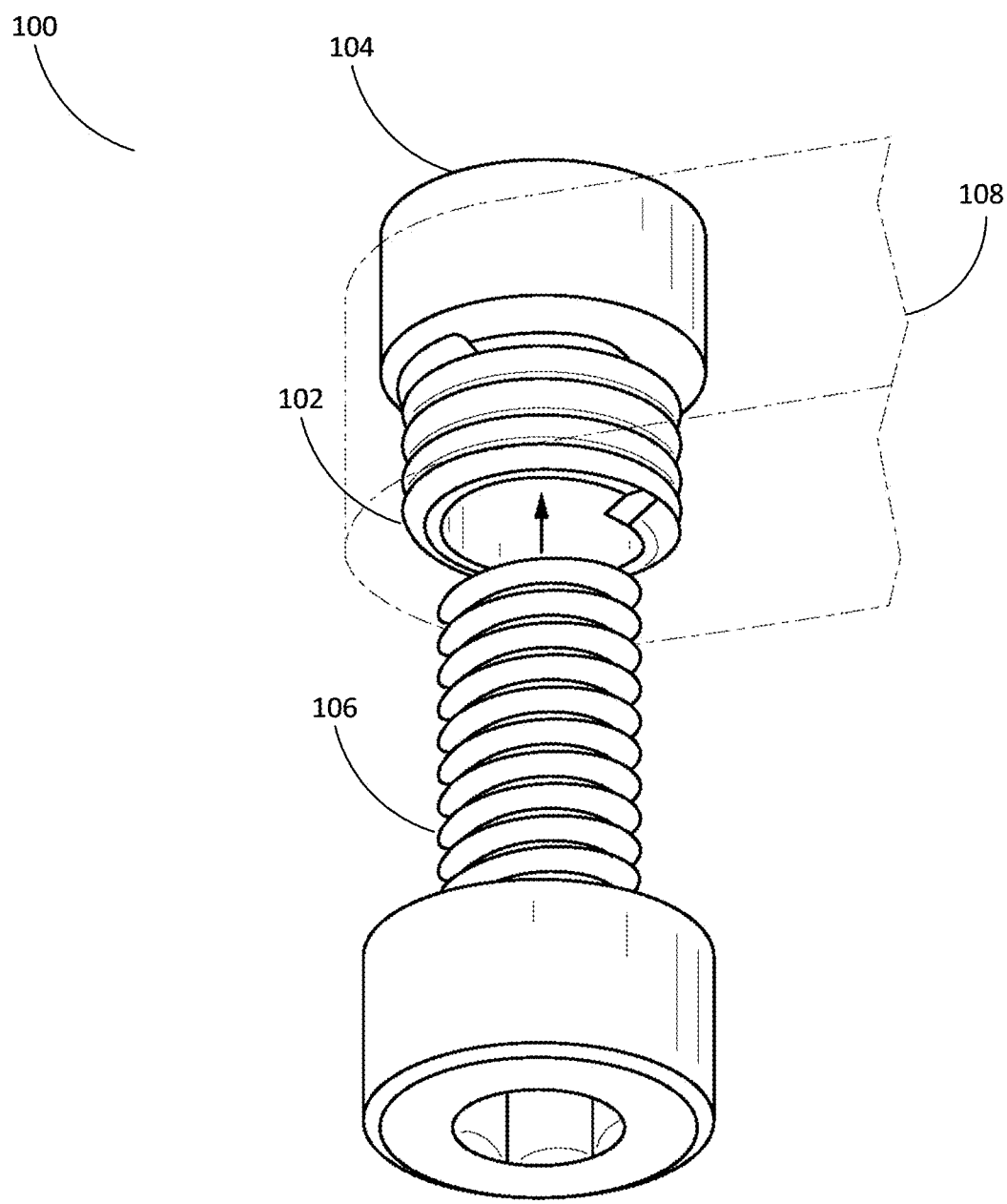
FIG. 1 illustrates a view of a fastening system in accordance with the disclosure.

FIG. 1 illustrates an embodiment of an exemplary fastening system 100 in accordance with the disclosure. The system may include a ferromagnetic threaded insert 102, a magnet 104, and a ferromagnetic screw 106. The magnet may be positioned at one end of a bore in a surrounding material 108. The diameter of the bore is large enough to accommodate the insert 102. In the embodiment shown in FIG. 1, the bore has a helical threaded interior surface and the insert 102 has a helical threaded outer surface adapted to engage the threads of the bore. In this embodiment, the insert 102 is secured within the bore by rotating the insert such that the threaded outer surface of the insert 102 engages the threaded interior surface of the bore. The insert, however, can be secured within the bore in any manner, including friction, adhesive, splines, locks, pins, etc.

Figure 2:
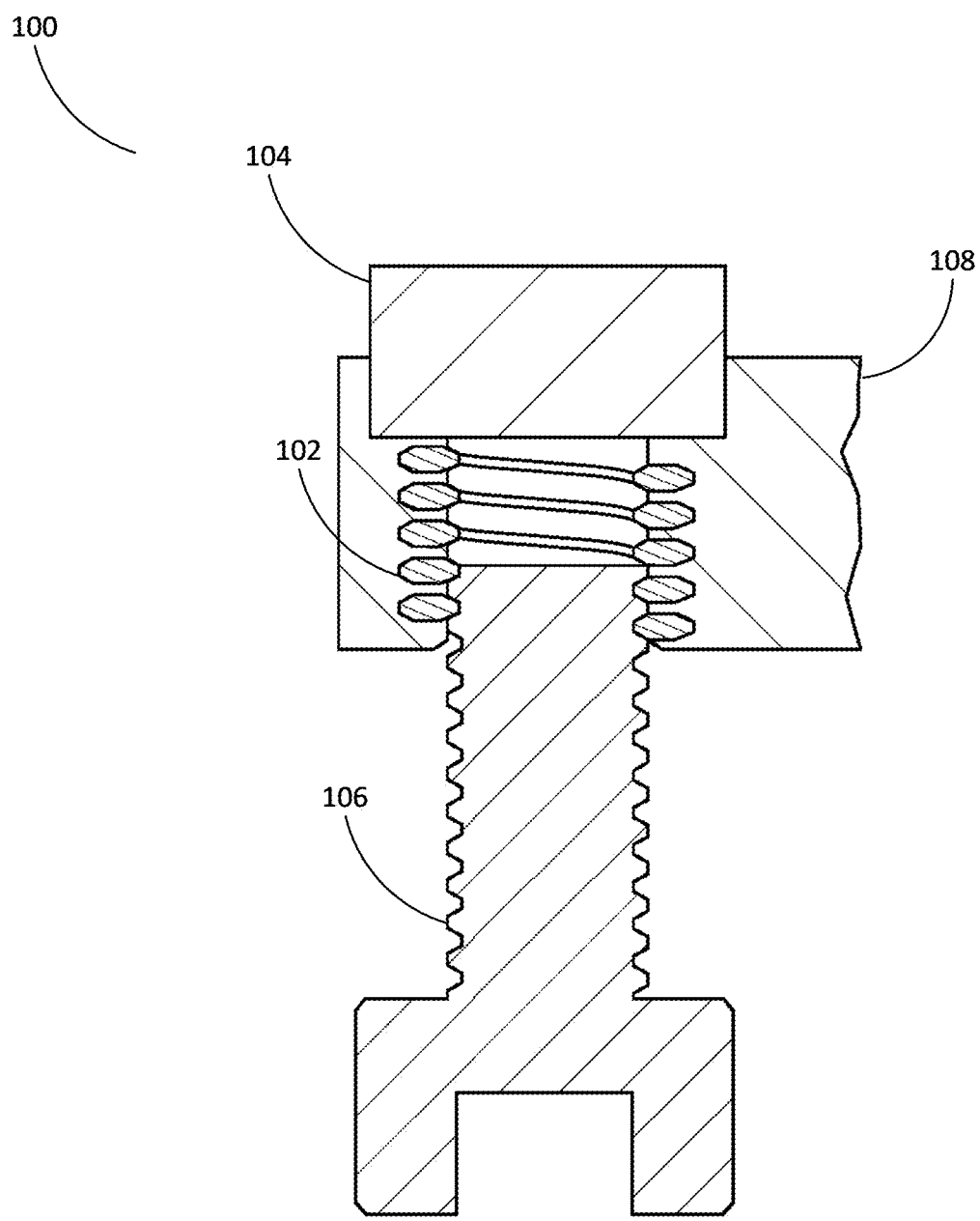
FIG. 2 illustrates a cross-sectional view of a fastening system in accordance with the disclosure.

FIG. 2 illustrates a cross-sectional view of a fastening system 100 in accordance with the disclosure. As discussed above with respect to FIG. 1, the system 100 may include a ferromagnetic insert 102, a magnet 104, and a ferromagnetic screw 106. The magnet 104 may be positioned at one end of a threaded bore in a surrounding material 108. The insert 102 may be screwed or otherwise inserted into the bore in the surrounding material 108. The ferromagnetic screw 106 may then be screwed into the insert 102. The ferromagnetic nature of the insert 102 directs the magnetic field from the magnet axially along the bore and pulls the tip of the screw 106 into a starting position with respect to the insert and holds it there, so a user may simply rotate the screw into engagement with the insert without requiring the user to also hold the tip of the screw in an appropriate position.

The insert 102 may be composed of a material having a magnetic permeability that is greater than that of the surrounding material. This ensures that the magnetic field emanating from the magnet is directed into a first end of the insert, which is closest to the magnet, through the material of the insert, and out a second end of the insert. The magnetic field emanating from the second end of the insert interacts with the ferromagnetic screw when the screw is placed in proximity of the second end of the insert. This magnetic interaction pulls the tip of the screw into contact with the insert and holds it in place. Examples of suitable materials for either the screw or the insert include iron, nickel, carbon steels, ferritic steels, duplex grade steels, martensitic grade steels, and precipitation hardened grade steels. In general, the magnetic permeability of the insert should be greater than that of the surrounding material. Because the magnetic permeability of the insert is higher than that of the surrounding material, the magnetic field provided by the magnet is concentrated or directed through the insert. This causes the tip (and thus the starting thread) of the ferromagnetic screw to be aligned and drawn into contact with the starting thread of the insert. From this position, the screw can simply be rotated into engagement with the interior surface of the insert.

In another embodiment, the insert itself could be composed of an axially magnetized material, thus eliminating the need for a separate magnet.

The disclosed fastening system may be particularly useful in applications where physical constraints frustrate the ability of an assembler to align the screw in its starting position and/or rotate the screw into its final position.

Figure 3A:
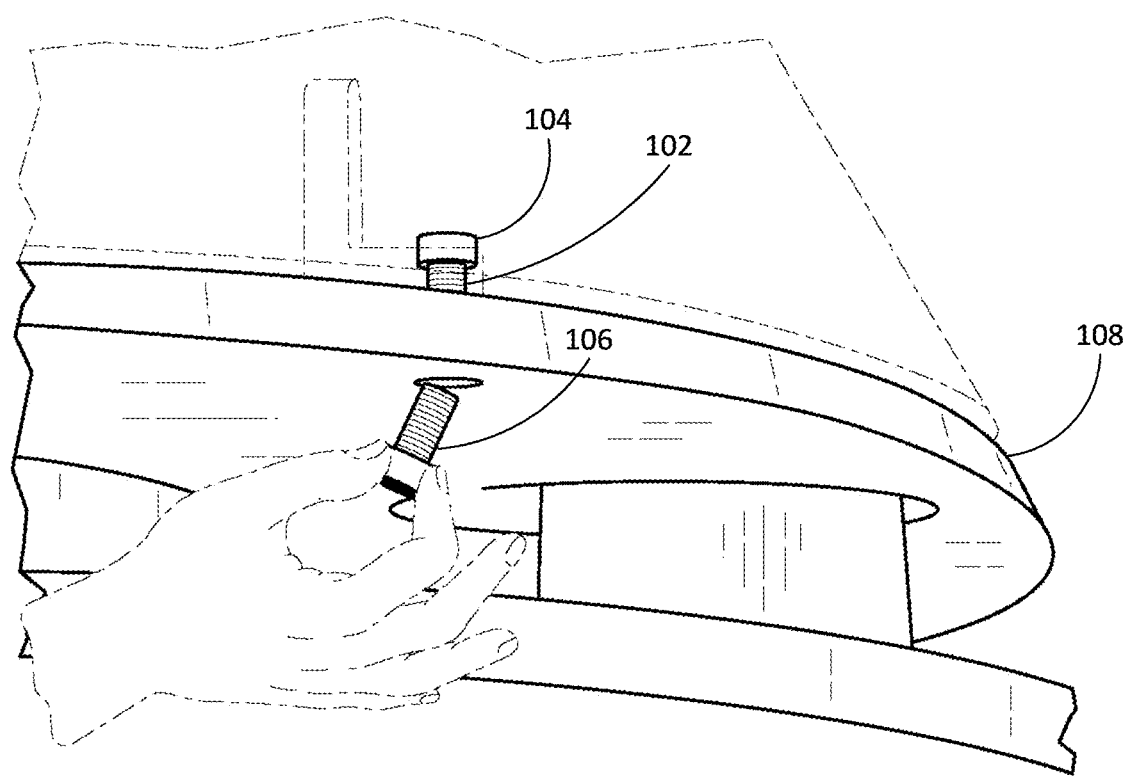
FIGS. 3A-3C illustrate an example use of a fastening system in accordance with the disclosure.
Figure 3B:
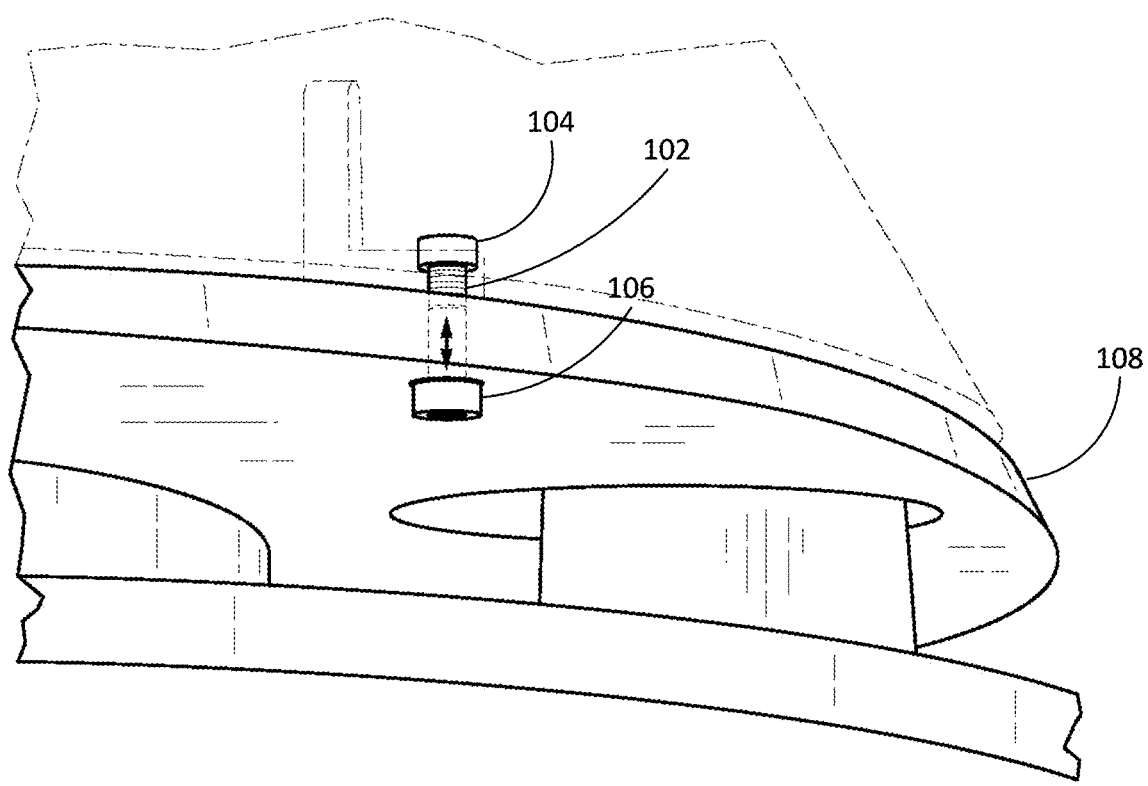
Figure 3C:
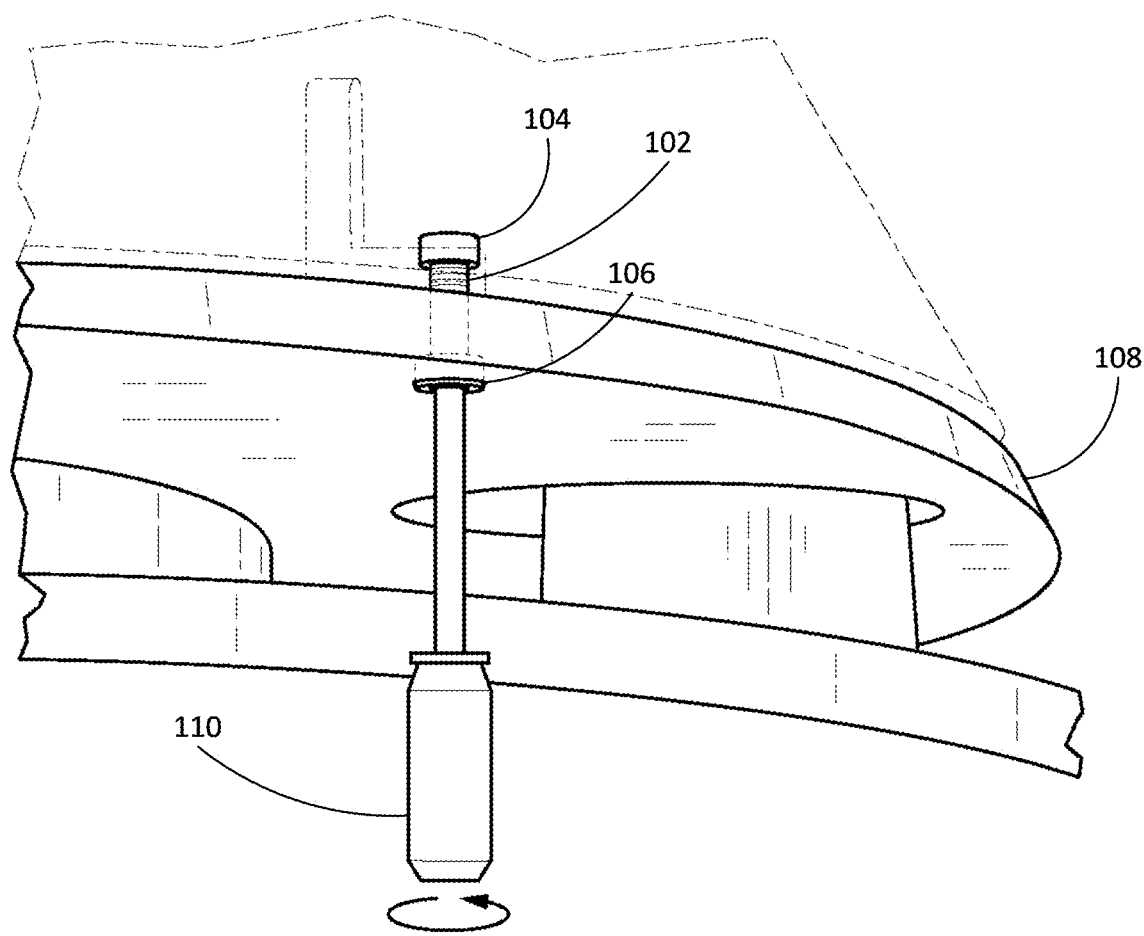

FIGS. 3A-3C show an example of a fastening application in which the ability of the assembler to position the screw in its starting position is limited both by a tight space and the fact that the screw must be held upwards in its starting position, in opposition to gravity, while the screw is also rotated to engage the threads of the insert.

As described above with respect to FIGS. 1 and 2, the example shown in FIGS. 3A-3C may include a ferromagnetic insert 102 installed within a bore in a surrounding material 108. A magnet may also be installed within the surrounding material 108 at one end of the bore. In FIG. 3A, a user roughly positions a screw in proximity of the other end of the bore. As shown in FIG. 3B, the screw is pulled into and held in a starting position with respect to the insert 102, without further manipulation by the user. As shown in FIG. 3C, the user is then free to complete the installation of the screw 106 by rotating the screw 106 into its final position using a driver 110.

In general, a fastening system in accordance with the disclosure may include a magnet disposed at one end of a bore and a ferromagnetic insert disposed within the bore in proximity to the magnet. Either the magnet, the insert, or both, may be installed at first stage of a manufacturing process. Later in the manufacturing process, when an assembler positions a screw in proximity to the other end of the bore, the magnetic field emanating from the magnet and directed through the insert pulls the screw into the starting position and holds it in place, even after the assembler releases their hold of the screw. The magnetic field not only instantly brings the threads of the screw into proper alignment with those of the insert, but also frees the assembler to reposition their hands, fingers, or tool(s) to rotate the screw into engagement with the insert. The disclosed fastening system may therefore reduce the number of attempts necessary to complete installation of a screw, thereby reducing assembly time and increasing production efficiency.

A method for fastening in accordance with this disclosure may include installing or otherwise positioning a magnet at a first end of a bore in a surrounding material. A ferromagnetic insert is also secured within the bore. These steps can occur in any order. The ferromagnetic insert may be composed of a material with a magnetic permeability that is higher than that of the surrounding material. Subsequently, a ferromagnetic screw is moved into proximity of the insert and pulled into a starting position by the magnetic field emanating from the insert. While being held in place by the magnetic field, the screw may be rotated into engagement with the insert.

Another advantage of the disclosed fastening system is realized in a disassembly process. For example, when a previously installed screw is being removed, it may be prone to fall, roll away, or otherwise become lost once its threads disengage with those of the bore or insert. Losing a screw within a larger assembly can require additional time to find the screw and/or cause damage to the assembly if not found. In the disclosed fastening system, however, the screw is held in place by the magnetic field even when the threads of the screw are disengaged from those of the insert. Thus, the disclosed fastening system may improve service and/or disassembly processes by reducing the occurrence of loose or lost screws.

While certain exemplary embodiments have been described and shown in the accompanying drawings, it is to be understood that such embodiments are merely illustrative of and not restrictive on the broader disclosure, and that this disclosure not be limited to the specific constructions and arrangements shown and described, since various other modifications may occur to those ordinarily skilled in the art.

What is claimed is:

1. A method for fastening comprising:
    securing a magnet to a surrounding material;
    securing a ferromagnetic insert within a bore in the surrounding material;
    after securing the ferromagnetic insert within the bore, positioning a ferromagnetic screw such that the tip of the screw is held in place against one end of the ferromagnetic insert by a magnetic field emanating from the magnet; and
    after the ferromagnetic screw is held in place by the magnetic field, rotating the ferromagnetic screw into engagement with a helical threaded interior surface of the insert.

2. The method of claim 1, wherein at least one of the insert and the screw is formed of a material selected from a group consisting of iron, nickel, carbon steel, ferritic steel, duplex grade steel, martensitic grade steel, and precipitation hardened grade steel.

3. The method of claim 1, wherein the exterior surface of the insert is helical threaded and securing the insert within the bore includes rotating the threaded exterior surface of the insert into engagement with a helical thread on the interior surface of the bore.

* * * * *